(12) United States Patent
Hastoy et al.

(10) Patent No.: US 7,544,347 B2
(45) Date of Patent: Jun. 9, 2009

(54) METHOD FOR SYNTHESIZING ZBM-30 ZEOLITE FROM A MIXTURE OF AMINE COMPOUNDS

(75) Inventors: Gaëlle Hastoy, Fontenay-sous-Bois (FR); Johan Martens, Huldenberg (BE); Emmanuelle Guillon, Vernaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 702 days.

(21) Appl. No.: 11/337,080

(22) Filed: Jan. 23, 2006

(65) Prior Publication Data

US 2006/0292070 A1    Dec. 28, 2006

(30) Foreign Application Priority Data

Jan. 24, 2005    (FR) .................................. 05 00712

(51) Int. Cl.
*C01B 39/04* (2006.01)
*B01J 29/70* (2006.01)
*B01J 29/06* (2006.01)
*B01J 29/04* (2006.01)

(52) U.S. Cl. ........................................ 423/703; 502/60
(58) Field of Classification Search ................. 423/703; 502/60
See application file for complete search history.

(56) References Cited

U.S. PATENT DOCUMENTS

| 4,401,637 | A | * | 8/1983 | Marosi et al. ................ 423/705 |
| 4,404,175 | A | * | 9/1983 | Marosi et al. ................ 423/703 |
| 7,282,465 | B2 | * | 10/2007 | Benazzi et al. ................. 502/64 |
| 2007/0134152 | A1 | * | 6/2007 | Caullet et al. ................ 423/700 |

FOREIGN PATENT DOCUMENTS

EP    0046504 A    3/1982

* cited by examiner

*Primary Examiner*—David M Brunsman
(74) *Attorney, Agent, or Firm*—Millen, White, Zelano & Branigan, P.C.

(57) ABSTRACT

The invention concerns a process for the synthesis of solid zeolitic ZBM-30, comprising:
  i) a mixing step, during which a mixture comprising at least one source of a tetravalent metal, at least one source of a trivalent metal, water and at least two amine compounds is prepared, resulting in the production of a gel; and
  ii) a crystallization step, during which said gel is maintained under conditions allowing the formation of a crystalline solid.

The invention also concerns the zeolite ZBM-30 obtained by said process.

20 Claims, No Drawings

METHOD FOR SYNTHESIZING ZBM-30 ZEOLITE FROM A MIXTURE OF AMINE COMPOUNDS

FIELD OF THE INVENTION

The invention relates to the preparation of zeolite type crystalline solids.

Better crystallinity along with good incorporation of trivalent elements into zeolitic structures constitute permanent goals for the skilled person.

PRIOR ART

The search for novel microporous molecular sieves has led over recent years to the synthesis of a wide variety of that class of products. A wide variety of aluminosilicates with a zeolitic structure characterized in particular by their chemical composition, the diameter of the pores they contain and the shape and geometry of their microporous system has thus been developed.

ZBM-30 zeolite and its preparation process have been described in European patent EP-A-0 046 504. Solid ZBM-30 is synthesized in the presence of an organic amine. The zeolite has an X ray diffraction diagram with the following peaks:

| d (Å) | I/I$_0$ |
|---|---|
| 11.60 | 36 |
| 10.82 | 15 |
| 5.80 | 11 |
| 4.18 | 100 |
| 3.87 | 79 |
| 2.84 | 16 |

In European patent application EP-A1-1 462 166, solid ZBM-30 synthesized in the presence of triethylenetetramine alone is particularly effective for the hydrosomerization of long chain paraffins and for reducing the pour point of hydrocarbon feeds.

When preparing such crystalline solids, in particular ZBM-30, the skilled person will seek to obtain better crystallinity along with better incorporation of aluminium into the zeolitic structure.

During the course of its research, the Applicant has discovered that surprisingly, the preparation of a ZBM-30 type zeolite as described above was facilitated by using an organic template comprising a mixture of at least two amine compounds.

BRIEF DESCRIPTION OF THE INVENTION

The invention pertains to a novel process for synthesizing solid zeolitic ZBM-30 synthesized using a mixture of at least two amine compounds.

When compared with those presented in the prior art, the preparation process of the invention is more effective and allows better incorporation of aluminium into the zeolitic structure.

DETAILED DESCRIPTION OF THE INVENTION

The present invention pertains to a novel process for synthesizing solid crystalline ZBM-30. Said solid has a chemical composition, expressed as the anhydrous compound in terms of moles of oxides, defined by the following general formula: $mXO_2$: $nZ_2O_3$: $q_iR_i$: $rM_{2/p}O$, in which M represents one or more cations with valency p, $R_i$ represents an amine compound i with i being a whole number equal to 2 or more, X represents one or more different tetravalent element(s), Z represents at least one trivalent element, m, n, r respectively represent the number of moles of $XO_2$, $Z_2O_3$, $M_{2/p}O$ and $q_i$ represents the number of moles of $R_i$.

The present invention thus provides a process for the synthesis of solid zeolitic ZBM-30, comprising:

i) a mixing step, during which a mixture comprising at least one source of a tetravalent metal, at least one source of a trivalent metal, water and at least two amine compounds is prepared, which step results in the production of a gel; and ii) a crystallization step, during which said gel is maintained under conditions allowing the formation of a crystalline solid.

The amine compounds used in the invention include alkylamines, alkyldiamines, alkyltriamines, alkyltetramines, alkylpentamines, alkylhexamines, pyrrolidine, piperazine, aminopiperazine and derivatives thereof.

Preferably, the organic amine compound comprises 1 to 20 carbon atoms.

The tetravalent metal is included in the group formed by silicon and germanium. Preferably, the tetravalent metal is silicon.

Advantageously, when the element X is silicon, the silica source may be any of those currently used in the synthesis of zeolites, for example solid powdered silica, silicic acid, colloidal silica or dissolved silica, or tetraethoxysilane (TEOS). Powdered silica sources which may be used include precipitated silicas, in particular those obtained by precipitation from a solution of alkali metal silicate, such as aerosil silicas, pyrogenic silicas, for example "CAB-O-SIL", and silica gels. It is possible to use colloidal silicas with different particle sizes, for example with a mean equivalent diameter in the range 10 to 15 nm or in the range 40 to 50 nm, such as those sold under trade names such as "LUDOX".

The trivalent metal includes aluminium, boron, iron, gallium, indium and titanium. Preferably, the selected trivalent metal is aluminium.

In the preferred case in which the trivalent metal is aluminium, the preferred alumina source is sodium aluminate or an aluminium salt, for example the chloride, nitrate, hydroxide or sulphate, an aluminium alkoxide or alumina per se, preferably in the hydrated or hydratable form, such as colloidal alumina, pseudoboehmite, gamma alumina or alpha or beta trihydrate. It is also possible to use mixtures of the sources cited above.

M is a cation with valency p; preferably, M is an alkali cation (group IA); more preferably, M is a sodium cation.

The composition of the mixture obtained during step i) may be described as follows:

$mXO_2$: $nZ_2O_3$: $pH_2O$: $q_iR_i$: $rM_{2/p}O$ m=100;

n is between 0 and 50;

p is between 0 and 160;

$\Sigma q_i$ is between 0.05 and 20;

r is between 0 and 10.

Preferably, no alkali metal is introduced during the synthesis.

The synthesis process comprises a mixing step (i), during which a reaction mixture is prepared comprising at least one source of a tetravalent metal, at least one source of a trivalent metal, water, and at least two amine compounds which act as an organic template.

This mixing step i) may be carried out in accordance with two preferred modes of the invention:

a) 1$^{st}$ implementation: Step i) is carried out by mixing the source of a tetravalent metal, of a trivalent metal, water and at least two amine compounds, with stirring, to form the final gel. The order of mixing may vary.

In one variation, the amine compounds may be pre-mixed, then the organic template formed by said mixture is added to the other elements of the reaction mixture.

The final gel obtained then undergoes crystallization step ii).

The relative proportion of each amine compound Ri in the final mixture is in the range 5% to 95% by weight, preferably in the range 20% to 80% by weight.

More preferably, when the number of amine compounds is equal to 2, the proportion of each amine compound is 50% by weight.

b) 2$^{nd}$ implementation: Step i) is carried out by mixing at least two precursor gels respectively obtained from each of the organic amine compounds (respectively operating as organic template for each precursor gel) in the presence of the sources of a tetravalent metal, of a trivalent metal, and water, to form the final gel.

Each precursor gel is homogenized and left to stand under static conditions for a period of 0.5 to 48 hours at a temperature in the range 0° C. to 200° C.

Each precursor gel is mixed at a temperature in the range 0° C. to 200° C., with stirring, for a period in the range 5 to 60 minutes.

The proportion of each precursor gel in the final mixture is in the range 5% to 95%, preferably in the range 20% to 80% by weight.

More preferably, when the number of gels equals 2, the proportion of each gel is 50% by weight.

The synthesis process of the invention comprises a crystallization step ii) during which the final gel obtained during step i) is maintained under conditions that allow the formation of a crystalline solid.

This step may be carried out using any method known to the skilled person, preferably in an autoclave. The gel is advantageously placed under hydrothermal conditions under autogenous reaction pressure, optionally by adding gas, for example nitrogen.

Advantageously, during crystallization step ii), the mixture obtained during step i) is heated to a crystallization temperature in the range 100° C. to 200° C., preferably in the range 135° C. to 175° C., for a crystallization period in the range 0.5 to 60 days, preferably in the range 1.5 to 20 days. The period necessary to obtain crystallization generally varies between 1 hour and several months, depending on the composition of the reagents in the gel, the stirring conditions and the reaction temperature. The reaction mixture may be vigorously stirred or not during the crystallization step period. Preferably, the reaction mixture is vigorously stirred.

It may be advantageous to add zeolitic seeds to the reaction mixture for step i) to reduce the time necessary for the preferential formation of solid crystalline ZBM-30 over the impurities. Preferably, the zeolitic seeds added completely or partially comprise crystals of solid ZBM-30. The zeolitic seeds are generally added in a proportion in the range 0.01% to 10% by weight of the oxide $XO_2$, preferably silica, used in the reaction mixture.

At the end of the reaction, the solid phase is filtered and washed; it is then ready for subsequent steps such as drying, dehydration and calcining and/or ion exchange. For these steps, any of the conventional methods known to the skilled person may be employed.

Preferably, the product obtained in crystallization step ii) undergoes at least one of the following steps:

iii) a step for separating the solid from the crystallization mixture;

iv) a step for washing the solid; and v) a step for drying said solid.

The crystalline solid is generally separated from the mixture using any method known to the skilled person, such as filtering. The solid is then washed with water or with THF (tetrahydrofuran).

Drying step v) is generally carried out at a temperature in the range 50° C. to 150° C., for a period of 12 to 30 hours.

Drying is preferably carried out at atmospheric pressure, but may be carried out under pressure.

Preferably, an ion exchange step is carried out at the end of synthesis to place the zeolite in the ammonium or acidic form using any ion exchange technique which is known to the skilled person.

Preferably, a calcining step is carried out at the end of synthesis to expose the porosity of the zeolitic solid by decomposing the amine compounds. Said calcining step may advantageously be carried out in air (or an oxidizing medium), at a temperature in the range 300° C. to 800° C.

The invention also concerns the solid ZBM-30 obtained by the preparation process described above.

The prepared solid ZBM-30 may be used as a catalyst or catalyst support for the transformation of hydrocarbons in refining and petrochemistry, and more particularly for hydrosomerization or catalytic dewaxing reactions.

The invention will be illustrated in the following examples:

EXAMPLE 1

Preparation of Precursor Gels (Synthesis of ZBM-30 by Mixing Gels)

The precursor gels were prepared using the following synthesis protocols (described for each organic amine compound):

precursor gel based on triethylenetetramine: A solution of 23.0775 g (Acros 96%) of triethylene tetramine was prepared in 23.0775 g of water. 3.845 g of aerosil (UCB 380 m$^2$/g) was added to this solution with continuous stirring, followed by 0.082 g of Al(OH)$_3$ (Merck);

precursor gel based on hexamethylenediamine: A solution of 25 g (Acros 99.5+%) of hexamethylenediamine was prepared in 25 g of water. 4 g of aerosil (UCB 380 m$^2$/g) was added to this first solution with continuous stirring, followed by 0.065 g of Al(OH)$_3$ (Merck);

precursor gel based on octylamine:

Solution A: 0.85 g of H$_2$SO$_4$ (Merck) was added to 6 g of water;

Solution B: 2.1 g of TMA-Br (Janssen) and 9.05 g of octylamine (Aldrich 98%) were added to 20.5 g of H$_2$O;

Solution C: 0.35 g of Al(NO$_3$)$_3$ was diluted in 5 g of H$_2$O.

Solution A and 9.35 g of water glass (composition by weight: 27% SiO$_2$, 8% Na$_2$O, 65% H$_2$O) were mixed with vigorous stirring, then solution B was added followed by solution C.

precursor gel based on propylamine:

Solution A: 0.034 g of Al(OH)$_3$ (Fluka 64/66%) was diluted in 8.165 g of water glass (composition by weight: 27% SiO$_2$, 8% Na$_2$O, 65% H$_2$O) (Merck);

Solution B: 0.766 g of H$_2$SO$_4$ (Merck) was added to 16.477 g of water;

Solution C: 18.268 g of $H_2O$ and 3.565 g of propylamine (Aldrich 98%) were added to 1.337 g of $H_2O$ and 1.337 g of TMA-Cl (Janssen).

Solutions A and B were initially mixed with vigorous stirring, followed by solution C;

precursor gel based on ethylenediamine:

5 g of aerosil (UCB, 380 $m^2/g$) was added with vigorous stirring to a solution of 0.0625 g of Na-aluminate (Riedel de Haën) and 33.825 g of $H_2O$, followed by 11.625 g of ethylenediamine (Acros 99%).

EXAMPLE 2

Synthesis of ZBM-30 by Mixing Precursor Gels at Ambient Temperature

Regarding the first type of gel mixing, the preparation of each individual precursor gel was carried out as described in Example 1. After preparation, each gel precursor was left at ambient temperature for at least 2 hours. Then, each precursor gel was initially homogenized, and mixed with another precursor gel (in a 50/50 w/w ratio), with stirring for 10 minutes (Table 1). The resulting final gel was placed in a Teflon-lined autoclave and heated to 170° C. with stirring (Table 1). For each gel mixture, different synthesis periods were employed.

TABLE 1

Mixing matured gels at ambient temperature - synthesis of zeolite

| Sample | Combination of templates in the two gels | Si/Al gel | Synthesis period (days) |
|---|---|---|---|
| S1 | Hexamethylenediamine + triethylenetetramine | 69 | 8 |
| S2 | Hexamethylenediamine + triethylenetetramine | 69 | 4 |
| S3 | Octylamine + triethylenetetramine | 67 | 8 |
| S4 | Octylamine + ethylenediamine | 195 | 3 |
| S5 | Ethylenediamine + hexamethylenediamine | 145 | 3 |
| S6 | Ethylenediamine + hexamethylenediamine | 145 | 6 |
| S7 | Ethylenediamine + hexamethylenediamine | 145 | 1.5 |
| S8 | Ethylenediamine + hexamethylenediamine | 145 | 13 |
| S9 | Octylamine + ethylenediamine | 195 | 1.5 |

EXAMPLE 3

Synthesis of ZBM-30 by Mixing Precursor Gels at 100° C.

As was the case in the gel mixing method described in Example 2, each precursor gel was prepared on the basis of the preparation described in Example 1. The precursor gels were matured separately in a stainless steel autoclave at 100° C. for 24 hours without stirring. Heating was then stopped and the autoclaves were cooled in a bath of cold water. The precursor gels were mixed in airs (50/50 ratio, % by weight) (Table 2), slowly mixed for 10 minutes, transferred into a stainless steel autoclave, heated to 170° C. and stirred (Table 2).

TABLE 2

Synthesis of ZBM-30 zeolite by mixing thermally matured gels

| Sample | Combination of amine compounds in the two gels | Si/Al of gel | Synthesis period (days) |
|---|---|---|---|
| S10 | Triethylenetetramine + hexamethylenediamine | 69 | 8 |
| S11 | Ethylenediamine + propylamine | 189 | 3 |
| S12 | Triethylenetetramine + propylamine | 68 | 8 |
| S13 | Triethylenetetramine + octylamine | 67 | 8 |
| S14 | Triethylenetetramine + ethylenediamine | 117 | 7 |
| S15 | Triethylenetetramine + octylamine | 67 | 4 |
| S16 | Triethylenetetramine + ethylenediamine | 117 | 4 |
| S17 | Triethylenetetramine + pyrrolidine | 97 | 7 |
| S18 | Octylamine + ethylenediamine | 195 | 5 |
| S21 | Triethylenetetramine + hexamethylenediamine | 69 | 2 |

EXAMPLE 4

Preparation of ZBM-30 Gel Using an Organic Template in the Form of a Mixture of Amine Compounds Triethylenetetramine-pyrrolidine combination A solution of triethylenetetramine (46.155 g) (Acros 96%) and pyrrolidine (23.08 g) (Fluka 99%) was prepared in 46.155 g of $H_2O$. 7.69 g of aerosil (UCB 380 $m^2/g$) was added with continuous stirring, followed by 0.165 g of $Al(OH)_3$ (Merck);

Triethylenetetramine-pyrrolidine combination

A solution of triethylenetetramine (46.155 g) (Acros 96%) was prepared in 46.155 g of $H_2O$. 7.69 g of aerosil (UCB 380 $m^2/g$) was added with continuous stirring, followed by 23.08 g of hexylamine (Aldrich 98%) and 0.165 g of $Al(OH)_3$ (Merck).

EXAMPLE 5

Synthesis of ZBM-30 Using an Organic Template in the Form of a Mixture of Amine Compounds For this mode of the synthesis, a mixture of amine compounds was used as the organic template: the first amine compound of the mixture was triethylenetetramine; the second compound was either pyrrolidine or hexylamine. The quantity of the second amine compound was 50% by weight of the quantity of triethylenetetramine in the gel. The protocols for preparing the final gel for each combination of amine compounds are described below.

The gels were transferred into stainless steel autoclaves and heated to 170° C., with stirring (Table 3). For each mixture of amine compounds, two synthesis periods were employed.

TABLE 3

Synthesis of zeolites using an organic template in the form of a mixture of amine compounds

| Sample | Template mixture | Si/Al of gel | Synthesis period (days) |
|---|---|---|---|
| S19 | Triethylenetetramine + pyrrolidine | 60 | 7 |
| S20 | Triethylenetetramine + hexylamine | 60 | 7 |
| S22 | Triethylenetetramine + pyrrolidine | 60 | 3 |
| S23 | Triethylenetetramine + hexylamine | 60 | 3 |

EXAMPLE 6

Si and Al Composition of a Solid ZBM-30 Prepared in Accordance with the Invention (Triethylenetetramine+hexylamine) and a Solid ZBM-30 Synthesized in the Presence of Triethylenetetramine Alone (Comparative)

Solid S20 was synthesized in accordance with Example 5 with an organic template in the form of a triethylenetetramine+hexylamine solution (50%/50% by weight).

Solid S24 was synthesized in accordance with EP-A-0 046 504 with triethylenetetramine as the sole organic template.

TABLE 4

Composition of solids

| Sample | Organic template | Si/Al gel | Synthesis period (days) | Si/Al solid |
|---|---|---|---|---|
| S20 | Triethylenetetramine + hexylamine | 60 | 7 | 56 |
| S24 | Triethylenetetramine | 60 | 7 | 65 |

The composition of Si and Al in the post-synthesis solids was measured by X ray fluorescence and compared with the Si, Al composition of the initial gel.

At gel iso-composition, the Si/Al ratio of the final solid was better when the organic template was composed of two amines. Aluminium incorporation was thus better in the case of a mixture of amine compounds.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 05/00.712, filed Jan. 24, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed:

1. A process for the synthesis of solid zeolitic ZBM-30, comprising:
   (i) a mixing step, during which a mixture comprising at least one source of a tetravalent metal, at least one source of a trivalent metal, water and at least two amine compounds is prepared, which step results in the production of a final gel;
   (ii) a crystallization step, during which said gel is maintained under conditions allowing the formation of a crystalline solid.

2. A process according to claim 1, in which the amine compounds are selected from the group consisting of alkylamines, alkyldiamines, alkyltriamines, alkyltetramines, alkylpentamines, alkylhexamines, pyrrolidine, piperazine, aminopiperazine and derivatives thereof.

3. A process according to claim 2 wherein the amine compounds comprise 1 to 20 carbon atoms.

4. A process according to claim 2 wherein the tetravalent metal comprises at least one of silicon and germanium.

5. A process according to claim 4 wherein the trivalent metal comprises at least one of aluminium, boron, iron, gallium, indium and titanium.

6. A process according to claim 1 wherein step (i) is carried out by mixing sources of a tetravalent metal, of a trivalent metal, water and at least two amine compounds with stirring to form the final gel.

7. A process according to claim 6, in which the amine compounds are pre-mixed before being added to the sources of a tetravalent metal, of a trivalent metal and water.

8. A process according to claim 6, in which the relative proportion of each amine compound $R_i$ in the final mixture is in the range 5% to 95% by weight.

9. A process according to claim 8 wherein the number of amine compounds equals 2, with a proportion of each amine compound of 50% by weight.

10. A process according to claim 1 wherein step (i) is carried out by mixing at least two precursor gels respectively obtained from each of the organic amine compounds in the presence of sources of a tetravalent metal, of a trivalent metal and water to form the final gel.

11. A process according to claim 10, wherein the proportion of each initial gel in the final mixture is in the range 5% to 95% by weight.

12. A process according to claim 10 wherein the number of precursor gels equals 2, with a proportion of each gel of 50% by weight.

13. A process according to claim 1 wherein during crystallization step ii), the mixture obtained during step i) is heated to a crystallization temperature in the range 100° C. to 200° C., for a crystallization period in the range 0.5 to 60 days, the reaction mixture being vigorously stirred or not stirred during the duration of the crystallization step.

14. A process according to claim 1 wherein zeolite seeds are added to the reaction mixture of step (i).

15. A process according to claim 14, in which the zeolite seeds are formed partially or completely from seeds of ZBM-30 zeolite.

16. A process according to claim 1 wherein the product obtained in crystallization step ii) undergoes at least one of the following steps:
   (iii) a step for separating the solid from the crystallization mixture;
   (iv) a step for washing the solid; and
   (v) a step for drying said solid.

17. A process according to claim 1 further comprising calcining the solid obtained in crystallization step (ii).

18. A solid crystalline ZBM-30 obtained by the process according to claim 1.

19. A process comprising providing a crystalline solid according to claim 18, as a catalyst or catalyst support, a conducting a transformation of hydrocarbons in in the presence of seed catalyst or catalyst support.

20. A process according to claim 19 comprising conducting hydroisomerization or a catalytic dewaxing reactions.

* * * * *